000

United States Patent
Joyce et al.

(10) Patent No.: US 8,924,595 B1
(45) Date of Patent: Dec. 30, 2014

(54) MIXED MODE SIMULATION

(71) Applicant: EMC Corporation, Hopkinton, MA (US)

(72) Inventors: Scott E. Joyce, Foxboro, MA (US); Norman M. Miles, Bedford, MA (US); Donald E. Labaj, Northborough, MA (US); Timothy J. Cox, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 7 days.

(21) Appl. No.: 13/798,545

(22) Filed: Mar. 13, 2013

(51) Int. Cl.
*G06F 3/00* (2006.01)
*G06F 12/00* (2006.01)
*G06F 3/06* (2006.01)

(52) U.S. Cl.
CPC .................................. *G06F 3/061* (2013.01)
USPC ............................................. 710/5; 711/165

(58) Field of Classification Search
CPC .... G06F 11/261; G06F 3/0664; G06F 3/0689
See application file for complete search history.

(56) References Cited

U.S. PATENT DOCUMENTS

2004/0186837 A1* 9/2004 Lambert et al. ................. 707/10
2006/0129781 A1* 6/2006 Gellai et al. .................. 711/170
2007/0011423 A1* 1/2007 Kaneda et al. ................ 711/165

OTHER PUBLICATIONS

Xuan Tang, et al., U.S. Appl. No. 13/627,195, filed Sep. 26, 2012, "Simulating Data Storage System Configuration Data," EMS-468US.
Scott E. Joyce, et al., U.S. Appl. No. 13/626,299, filed Sep. 25, 2012, "Client Request Processing Using Protocol Abstraction," EMS-471US.

* cited by examiner

*Primary Examiner* — Hyun Nam
(74) *Attorney, Agent, or Firm* — Muirhead and Saturnelli LLC

(57) ABSTRACT

Described are techniques for servicing command requests. A first command request is received. A determining step is performed to determine whether to simulate servicing the first command request using a simulator or whether to service the first command by processing in accordance with a non-simulation mode. The first command request is one of a plurality of command requests, and a first portion of the plurality of command requests are simulated whereby the first portion of commands are serviced using the simulator and a second portion of the command requests are serviced in the non-simulation mode. The first command request is serviced in accordance with the determining step.

19 Claims, 11 Drawing Sheets

MIXED MODE SIMULATION

BACKGROUND

1. Technical Field

This application relates to techniques used in connection with simulation that may be performed to service client requests.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Management software may be used in connection with management of data storage systems. The management software, as well as more generally any software, may obtain inputs used in connection with performing an operation or task. For example, user inputs may be obtained using a user interface. The management software may be characterized as a client which issues requests to a server, such as a data storage system, in connection with performing requested operations.

SUMMARY OF THE INVENTION

In accordance with one aspect of the invention is a method of servicing one or more command requests comprising: receiving a first command request; determining whether to simulate servicing the first command request using a simulator or whether to service the first command by processing in accordance with a non-simulation mode, wherein said first command request is one of a plurality of command requests, and a first portion of the plurality of command requests are simulated whereby the first portion of commands are serviced using the simulator and a second portion of the command requests are serviced in the non-simulation mode; and servicing the first command request in accordance with said determining. The determining may be performed at runtime during execution of first code receiving the first command request. An option may be specified for one command request of the second portion indicating that simulation mode for said one command request is disabled. The command request may be the one command request and the simulator may include code for simulating the first command request. The determining may use the option to determine that the first command request is not serviced by simulation using the simulator and that the first command request is serviced by issuing the command to a server for processing in the non-simulation mode. The server may be a data storage system and the first command request may be issued by a user interface of a data storage system management application. The first command request may be a command to perform any of a get operation returning information regarding a data storage system configuration to the user interface, a create operation to create a new instance of an entity in a data storage system configuration, an update operation to update an existing instance of an entity in a data storage system configuration, and a delete operation to delete an existing instance of an entity in a data storage system configuration. The simulator may include code for simulating the first portion of command requests and for simulating at least one command request of the second portion whereby simulation for the at least one command request may be disabled in accordance with an options file identifying that simulation mode is disabled for said at least one command request. Each of the plurality of command requests may be a request to perform a command with respect to an object type and one or more optional parameters. The simulator may simulate servicing command requests in connection with performing a data storage management operation. The simulator may perform processing to simulate command requests as if performed by a data storage system in accordance with simulated configuration data simulating at least some entities of a current configuration of the data storage system. The simulated configuration data may use an object model and may include an object for a plurality of logical and physical entities of the data storage system being simulated. The object model may include a plurality of object types, where each of said plurality of logical and physical entities may be one of the plurality of object types, and wherein said plurality of object types may include any of a physical storage device, a logical storage device, a RAID group, a storage group, a physical component of the data storage system being simulated, and a logical component of the data storage system being simulated. The step of determining whether to simulate the first command request using a simulator or whether to service the first command by processing in accordance with a non-simulation mode may further include processing a prioritized list of simulation mode handlers, said processing including inquiring whether at least one of the simulation mode handlers simulates the first command request. Inquiries may be made regarding whether simulation mode handlers of the prioritized list simulate the first command request and the prioritized list may be processed until either an indication is received that a first of the simulation mode handlers performs simulation for the first command request or an indication is received for each of the simulation mode handlers in the prioritized list denoting that said each simulation mode handler does not perform simulation for the first command request. If an indication is received that a first of the simulation mode handlers performs simulation for the first command request, processing may be performed to simulate the first command request by invoking the first simulation mode handler. If an indication is received for each of the simulation mode handlers in the prioritized list denoting that said each simulation mode handler does not perform simulation for the first command request, processing may be performed to service the first command request using non-simulation mode whereby the first command request is issued to a server to service the first command request. Inquiries may be made regarding whether simulation mode handlers of the prioritized list simulate the first command request and said prioritized list may be processed until an indication is received that a first of the simulation mode handlers performs simulation for the first command request, an indication is received for each of the simulation mode handlers in the prioritized list denoting that said each simulation mode handler does not perform simulation for the first command request, or an indication is received from one of the simulation mode handlers that said one handler is capable of simulating the first command request and said one handler is disabled from simulating the first command request. Responsive to the one simulation mode handler indicating that the one handler is capable of simulating the first command request and is disabled from simulating the first command request, the first command request may be processed using non-simulation mode whereby the command request may be issued to a server to service the first command request.

In accordance with another aspect of the invention is a system comprising a data storage system including: a data store of configuration data indicating a current data storage configuration of the data storage system; and a first computer readable medium including code stored thereon, the first computer readable medium including code for: servicing command requests in connection with data storage system management operations; and a management system including a second computer readable medium with code of a data storage system management application thereon, the data storage management application including code for: a user interface that issues command requests to first code; said first code that receives command requests from the user interface and determines at runtime whether to simulate received command requests using a simulator, or whether to service the received command requests by issuing the received command requests to the data storage system for servicing in a non-simulation mode; and said simulator that simulates command requests, said simulator simulating processing performed to service command requests as if performed by the data storage system, said simulator using configuration data simulating at least part of a data storage configuration of the data storage system, wherein the simulator includes code for simulating a first portion of command requests and the simulator does not include code for simulating a second portion of command requests different from command requests of the first portion. The first code may determine whether to simulate a first command request in accordance with whether the simulator includes code for simulating the first command request and whether simulation is disabled for the first command request.

In accordance with another aspect of the invention is a computer readable medium comprising code stored thereon for servicing one or more command requests, the computer readable medium comprising code for: receiving a first command request; determining whether to simulate servicing the first command request using a simulator or whether to service the first command by processing in accordance with a non-simulation mode, wherein said first command request is one of a plurality of command requests, and a first portion of the plurality of command requests are simulated whereby the first portion of commands are serviced using the simulator and a second portion of the command requests are serviced in the non-simulation mode; and servicing the first command request in accordance with said determining. An option may be specified for one command request of the second portion indicating that simulation mode for said one command request is disabled.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
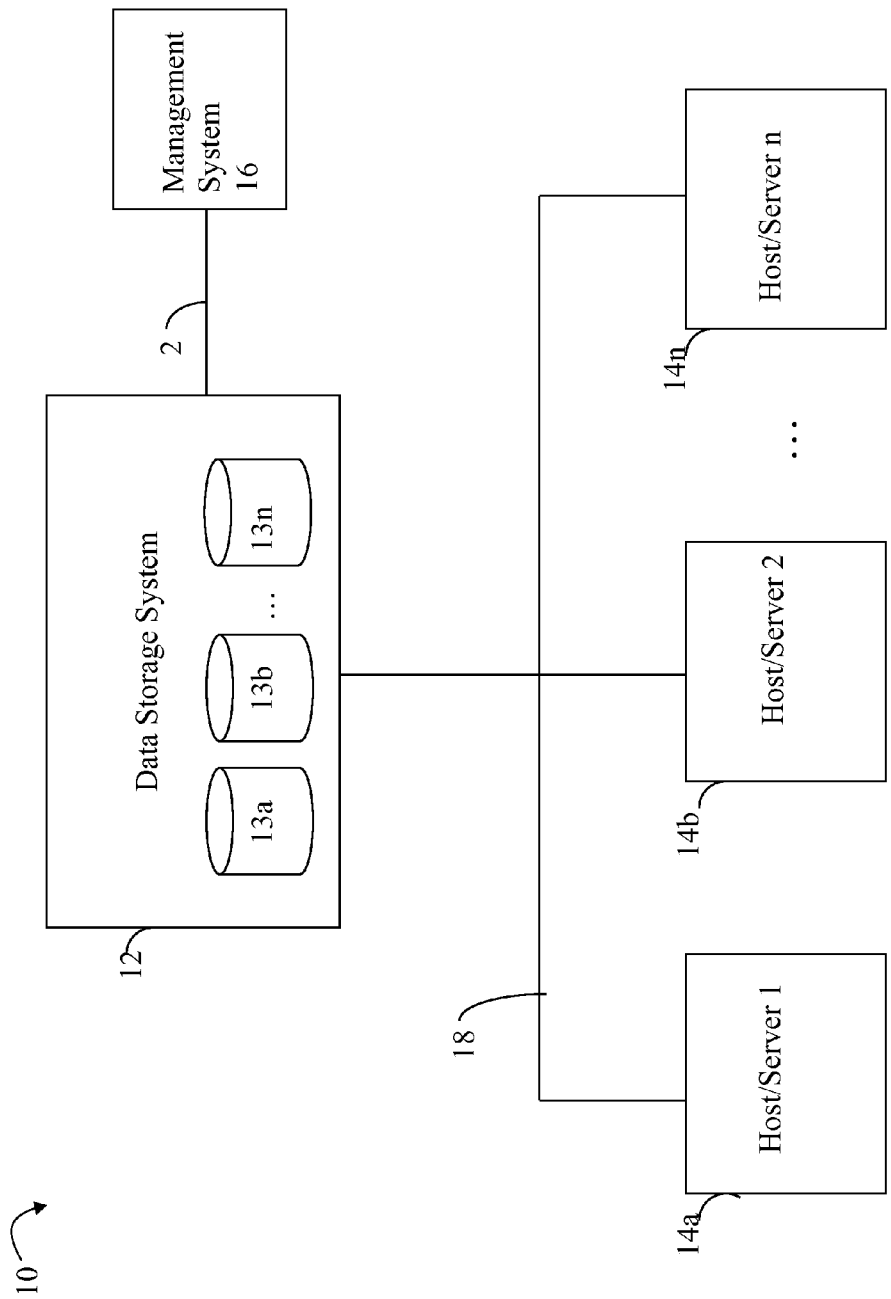
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel (FC) connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
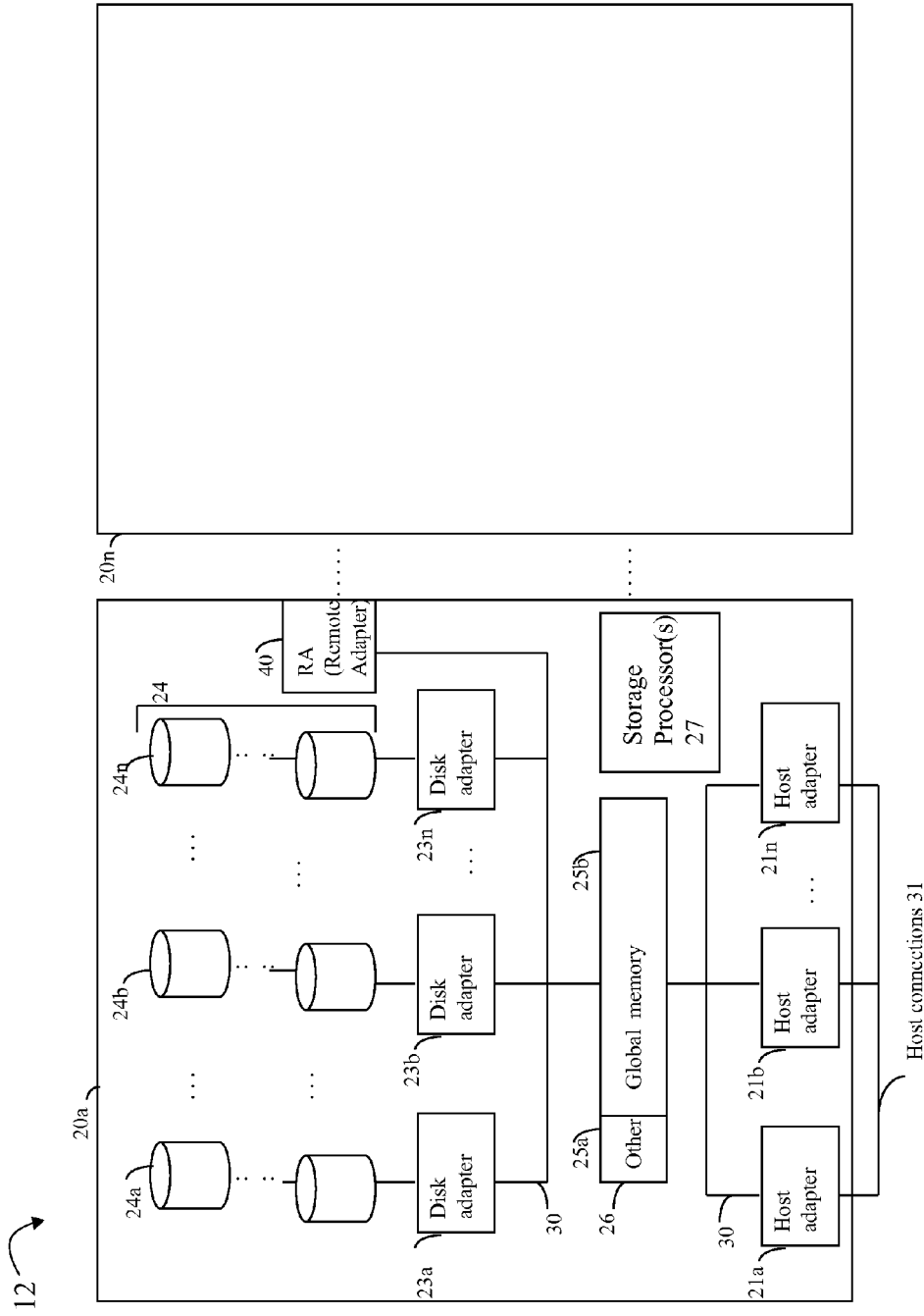
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

Also shown in the storage system 20a is an RA or remote adapter 40. The RA may be hardware including a processor used to facilitate communication between data storage systems, such as between two of the same or different types of data storage systems.

The system 20a may also include one or more storage processors 27. Each of the storage processors 27 may be CPU and an embodiment may include any number of such processors. For example, the VNX® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses or other internal connections 30 and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Management software may execute on the data storage system and/or management system. A client, such as a user interface (UI) of the data storage system management software included in the management system 16, may be used by an administrator in connection with performing data storage management operations. For example, the administrator may view information using a graphical UI (GUI) regarding the current data storage configuration, may perform an operation such as create or configure a logical entity such as a RAID group, LUN or LV, storage group (SG) of one or more LUNs, and the like. A logical entity such as a RAID group may be represented by an object having attributes such as indicating a RAID level of the RAID group (e.g., RAID-0, 1, 5, or 6), a number of data and/or parity drives, and the like.

During operation of the data storage system management application, the GUI may issue a command request such as in the form of an API call to first code that performs processing to service the command request. The first code of the API may further perform other calls to lower software layers which result in a request being issued to the data storage system to service the command request. The command request from the GUI may be, for example, in response to a request to obtain data storage management information from the data storage system for display, to perform an operation such as described above an elsewhere herein which results in a modification to existing data storage configuration data describing the configuration of the data storage system, and the like. As described herein, simulation may be performed in connection with servicing the command request rather than servicing the command request in non-simulation mode by forwarding to the data storage system. Some embodiments may support simulating the command request which may allow testing and use of the GUI and management application without requiring the physical data storage system. Such simulation may be performed, for example, by a client system including the management application whereby the client further includes software to perform the simulation using a set of configuration data used to simulate the data storage system configuration. In this manner, a user (e.g., customer or software developer of the management application) may use the management application and its GUI without requiring an actual data storage system and data storage system environment. In this manner, development may use simulation to test the code of the API invoked by the GUI, or more generally, test software included in the client-side management application, without requiring use of a data storage system. As will be described in following paragraphs, techniques herein provide for use of a simulator which operates in a mixed simulation mode or partial simulation mode whereby some command requests may be serviced using simulation and other command requests may be serviced by issuing the request to the data storage system for actual service in non-simulation mode. Using such a mixed simulation mode, techniques herein may be used for testing code of the API invoked for performing different command requests. For example, the underlying API code and possibly lower software layers facilitating communications with the data storage system may only include functionality to perform a portion of all possible command requests and whereby the remaining portion of commands may be serviced using simulation until the management application is capable of servicing such remaining portion of commands in the non-simulation mode. In this manner, code of the management application may include partially implemented functionality for servicing some command requests by issuing such requests to the data storage system and where the management application may be incapable of servicing other command requests (e.g., may not include functionality for processing and forwarding the other command requests to the data storage system for processing). Using techniques herein, servicing of the other command requests may be simulated thereby allowing for the GUI of the management interface to be utilized and tested for all supported command requests even though the underlying software may not be fully implement or capable of servicing all such command requests. Simulation may be performed on a per command request basis when executing in the mixed mode or partial simulation mode. When the command request is serviced using simulation, the simulator services the command request using configuration data that simulates a data storage system configuration and the simulator also simulates operations performed with respect to this configuration.

When a command request is serviced in a non-simulated mode, the command request may be forwarded to actual data storage system for processing in the usual mode of operation thereby requiring the actual data storage system hardware and software and an actual associated data storage system configuration.

Simulation mode provides, for example, simulating modifications made to a data storage system configuration and simulating calls made between lower software layers in the runtime stack as a result of a GUI of a data storage management application issuing a command request to perform an operation. For example, the GUI may issue a command request to an API to perform an operation, such as obtain data storage configuration information for display, perform an operation causing a modification to the existing data storage configuration (e.g., create a new logical entity of the configuration, modify an existing entity of the data storage configuration), and the like. Such API calls may be characterized as simulated if they are performed without using an actual data storage system (e.g., no data storage system hardware required or used) and without the API code performing calls to a data storage system to service the command request. Such API calls to the data storage system may be simulated using a previously generated set of data storage configuration data. In response to a request made through the GUI of the data storage management application, the request to perform a command may be serviced by performing actual calls to a data storage system, or may otherwise be serviced by simulating such calls, simulating the data storage system and its configuration, and simulating any data storage system configuration operations. As described in more detail below, in some instances, it may be desirable to service some command requests (e.g., as may be issued as an API call) using a data storage system and running in a non-simulation mode while also servicing other command requests using simulated configuration data and simulating servicing of the command request using a simulator as if serviced by code of the data storage system using its actual data storage configuration data. As described in more detail in following paragraphs, the command request issued by the GUI may be, for example to view information regarding logical and/or physical data storage system entities of the data storage configuration (e.g., list physical storage devices and associated properties and statuses, list logical storage entities such as logical devices having storage provisioned on physical storage devices, list properties of such logical devices), perform an operation (e.g., create, delete, modify) with respect to a logical storage entity (e.g., logical storage device, storage group of one or more logical storage devices)) of the configuration, and the like.

Techniques herein provide for a mixed simulation mode whereby a first portion of command requests of the data storage management application may be performed in a simulated mode and a second portion of command requests of the data storage management application may be performed in a non-simulated or live mode using an actual data storage system and its current configuration.

An embodiment in accordance with techniques herein may provide for turning on or off simulation mode for certain command requests. For example, first code of the data storage management application used in implementing a first command whereby the first code performs calls to the data storage system to service the first command may not be implemented or developed, and second code of the data storage management application used in implementing a second command whereby the second code performs calls to the data storage system to service the second command may be implemented. Using techniques herein, the data storage management application may operate in a mixed or partial simulation mode whereby processing may be performed to simulate the first command (thereby simulating processing performed the data storage system hardware using its associated configuration to service the first command) and also operate in a non-simulated mode with respect to the second command whereby calls are made to the data storage system to service the second command in accordance with the actual current configuration of the data storage system. As described below in more detail, an embodiment may provide for specifying an option to selectively disable simulating particular command requests even though the simulator may include functionality to perform such command request simulations.

Figure 3:
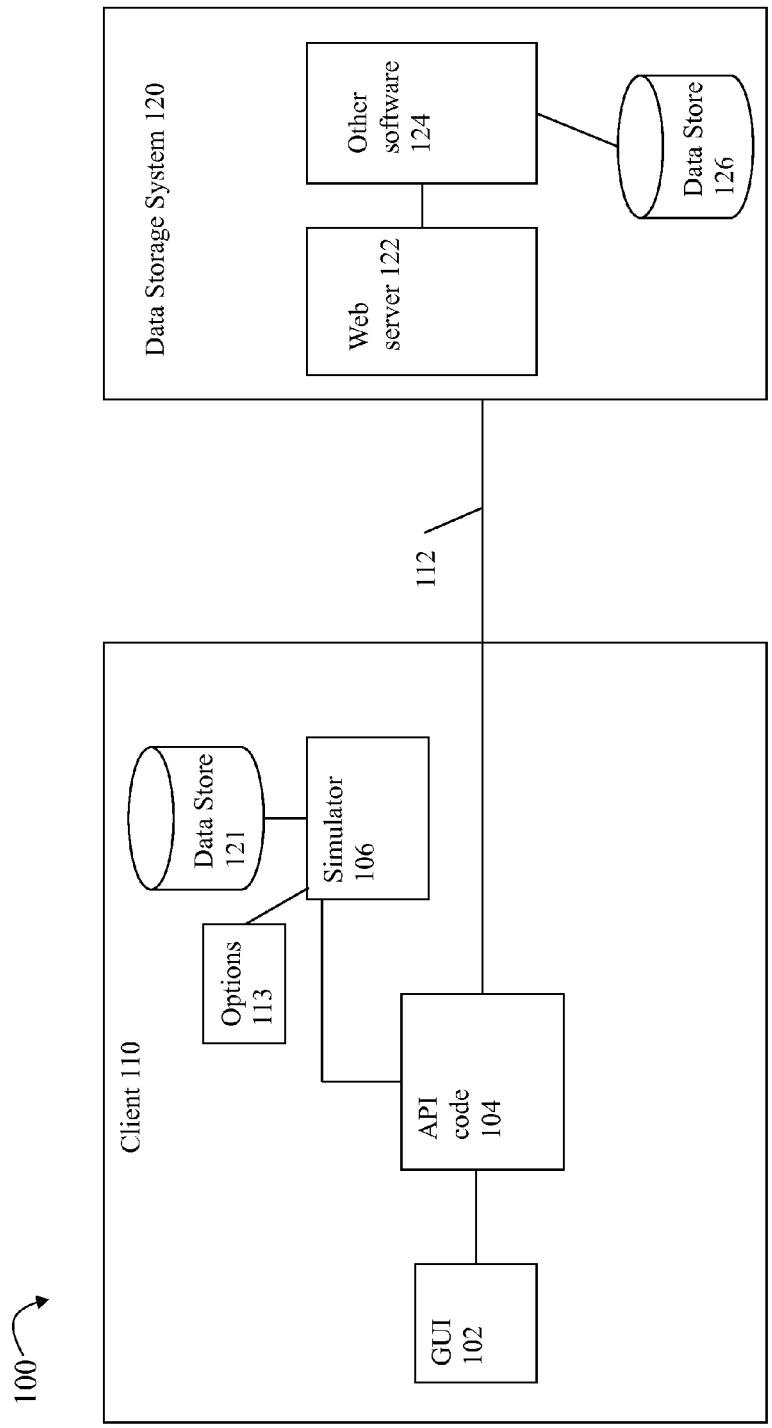
FIG. 3 is an example of components of a client and server of an embodiment that may utilize techniques described herein.

Referring to FIG. 3, shown is an example of components that may be included in an embodiment in accordance with techniques herein. The example 100 includes a client 110 and data storage system 120. The client 110 may be, for example, data storage management software executing on the management system 16 or other computer system or management device. The management software, or more generally client 110, may include code providing a GUI 102, API (application programming interface) code 104 and a simulator 106. The GUI 102 may issue a command in the form of an API call to the API code 104 to perform an operation. For example, the GUI 102 may issue a command to get a list of LUNs or physical storage devices and associated properties whereby the information returned in response to the command will be displayed on a display device or otherwise communicated to the user. The command may be issued in response to a user's request for particular information whereby the request is made via user-input(s) such as from one or more menu selections or other UI elements. The command from GUI 102 may be an API call to API code 104. The API code 104 performs processing to determine whether to use the simulator 106 to service the command request, or otherwise issue a command to the data storage system 120 to service the command request. The API code 104 may be invoked in connection with any one of a set of commands that may possibly be issued from the GUI 102.

In accordance with techniques herein, the set of commands may include a first portion of commands for which the API code 104 uses the simulator 106 to simulate a data storage system and its configuration which service the commands using configuration data of the data store 121 and return any requested information to the API code 104. The set of commands may include a second portion for which the API code 104 does not use the simulator 106 and rather issues the commands to the data storage system 120 over connection 112 (which may be a network connection) for processing. The processing performed to service the second portion of commands is processing that operates in a real non-simulated mode to communicate with the data storage system. The data storage system 120 then performs processing to service the command and return any requested information to the API code 104. In accordance with techniques herein, the information returned to the API code 104 as a result of servicing a command may be the same whether the information is returned from the data storage system 120 when operating in a non-simulated mode or whether the information is returned from the simulator 106 when operating in a simulated mode. The foregoing determination made by the API code 104 of whether to service a command request using the simulator 106 (thereby simulating the data storage system and its configuration), or whether to service the command requested by issuing the request to the data storage system 120 (thereby operating in an non-simulating mode where the command is serviced by the data storage system having a data storage configuration) may be performed at runtime while executing code of the data storage management application. An embodiment may include options 113 read as an input by the simulator 106. The options 113 may include information specifying which one or more command requests for which simulation mode is disabled/serviced using non-simulation mode even if the simulator includes functionality for simulating the identified command requests. In this manner, such identified command requests having simulation mode disabled may always be serviced using non-simulation mode (e.g., without using the simulator 106 and alternatively serviced by issuing the request to the data storage system for servicing using its configuration data). If the simulator 106 includes functionality to simulate a command request and simulation for the command request is not otherwise disabled by the options 113, the command request may be simulated by the simulator 106. The options 113 are described in more detail elsewhere herein.

In this manner, the management application may be executed and include a GUI or other user interface. If portions of the underlying functionality of the application with respect to issuing particular command requests to the data storage system are under development or otherwise not yet operational for use with the application, the simulator may be used thereby providing a simulated data storage system and configuration to service the particular command requests in a simulation mode. If other portions of the application are developed and operational for use in issuing other command requests to the actual data storage system, servicing such other commands requests may be performed in a real non-simulated mode whereby the other command requests may be serviced by issuing the command requests to the data storage system for processing using its defined data storage system configuration.

In connection with the data storage management software, or more generally, any software of a client 110, various user inputs may be obtained in connection with performing a requested operation. For example, a user may select an operation to be performed in connection with data storage management. The user may also provide additional inputs specifying parameters for the operation using the GUI in connection with performing the requested operation. When servicing a command to perform an operation in a non-simulation mode, the management software may be characterized as a client 110 which issues requests on behalf of a user to the data storage system 120 to perform a data storage management operation or task such as, for example, view selected portions of data storage configuration information regarding a current configuration and state of the data storage system (e.g., list of currently defined LUNs, SGs of LUNs (e.g., an SG may be a logical entity of one or more associated LUNs), and the like), and create or modify the current data storage configuration (e.g., configure or provision physical storage for new LUNs from one or more physical devices (PDs), create or configure new RAID groups, create a new SG, modify an existing SG such as by adding or removing LUNs, and the like). In connection with such requests received at the data storage system from the management software, the management software may be characterized as a client requesting an operation or service of the data storage system, whereby the data storage system may service the request thereby functioning generally as a server. A client request may be processed and issued to the data storage system 120. The data storage system 120 may include software that services the command request and may return information, if any, to the client 110 in accordance with the particular command request. When servicing a command operating in simulation mode, the management software may be characterized as a client 110 which issues requests on behalf of a user to the simulator 106 which simulates servicing of the command request as if performed by the data storage system using simulated configuration data included in data store 121.

As will be described in more detail elsewhere herein, the associated runtime path when executing in simulation mode may include the API code 104 invoking the simulator 106 to service a command request from the GUI 102. The simulator 106 may perform processing to service the command request using simulator configuration data rather using actual configuration data obtained from the data storage system 120. In this manner, the simulator 106 may simulate the presence of a data storage system and its configuration using data of data store 121 and may also simulate services performed by the data storage system in connection with servicing the command request from the GUI 102. Such simulation may have a variety of different suitable uses and applications such as, for example, when testing client-side software, or portions of the client-side software, without requiring the hardware and/or software of a data storage system.

The GUI 102 may generally be characterized as providing the UI for the management software or client 110. For example, the GUI 102 may display screenshots including various UI elements (e.g., menus, buttons, navigation or hyperlinks, and the like). The UI elements may provide for different user interactions. For example, a UI element may be a menu from which a user makes a selection to perform an operation, select parameters for the request, and the like. The GUI 102 may include code for creating the particular UI elements, displaying information and UI elements to the user, interacting with the user, and the like. For example, the GUI 102 may include code for implementing a UI including particular UI elements for a menu, menu items, tables, and the like. The UI elements may include a menu from which a user may select a menu item to perform a particular operation such as display a table of LUNs and properties for those LUNs. In one embodiment, object-based models may be used. For example, each physical and/or logical entity used by the client may be represented by a corresponding object having a set of properties. Each LUN, PD, SG, and the like, may be represented by an object having property values for that particular represented entity. For example, a PD may be a disk having a PD object with properties values based on the physical disk. The disk may have a storage capacity, unique identifier (ID), and type (e.g., FC 10K RPM rotating disk, FC 15K RPM rotating disk, flash or SSD storage device, and the like) where the property values of the PD object are set to denote those particular characteristics for the physical disk being represented.

The GUI 102 may issue a command to the API code 104 that is a request to perform an operation. The command may include one or more parameters. For example, the GUI 102 may issue a command to obtain and return a list of LUNs and one or more selected LUN properties of these LUNs. In turn, the command may be serviced using a simulated data storage system and simulated data storage system configuration as provided by the simulator 106, or the command may alternatively be serviced in a non-simulated mode whereby the command may be issued to the data storage system which performs processing to service the request. The processing performed by the data storage system may be performed in accordance with the actual data storage configuration of data storage system and its current state of various hardware and software components rather than using simulated data storage configuration data. When operating in non-simulation mode, operations which modify (e.g., create, delete, update) objects representing entities of the data storage system configuration result in changes to the actual configuration of the data storage system 120. Similarly, when operating in simulation mode to service a command, such operations to modify objects representing entities in the data storage system configuration may result in changes to the simulated data storage system configuration of data store 121 (e.g., modify the set of data configuration data as stored and used by the simulator 106 representing a modeled data storage system configuration). As noted above, the commands may include requests to read or retrieve configuration data (from either the simulator 106 when servicing the request in simulation mode or from the data storage system 120 when servicing the request in non-simulation mode) whereby such data may then be returned to the API code 104 and then the GUI 102. The commands may also include commands to perform a requested service or operation and may result in writing data (e.g., update existing configuration data or create new instances of data) regarding the data storage configuration.

The simulator 106 may use a set of simulated configuration data included in data store 121 such as, for example, in connection with servicing a command without requiring the actual hardware of the data storage system and interaction with the data storage system. For example, it may be that software of the client 110 and/or on the data storage system 120 used in servicing the particular command in non-simulated mode is not available, not implemented and/or otherwise not operational for servicing the request. In this case, the command may be serviced using the simulator 106. As a further example, it may be that a first set of software modules of the client 110 and/or data storage system 120 used in servicing some first commands are not yet implemented. However, a second set of software modules of the client 110 and/or data storage systems 120 used in servicing other second commands are implemented. In accordance with techniques herein, the GUI 102 may issue requests to the API code 104 to perform all commands (including the first and second commands) and the API code 104 may make a runtime determination as to whether to service the request operating in a simulation mode (e.g., using the simulator 106) or a non-simulation mode (e.g., issuing the request to the data storage system 120).

When servicing a command using non-simulation mode, the client 110 may issue the command request over connection 112 and communicate with a web server 122 of the data storage system 120. For example, the web server 122 may be an Apache/Tomcat web server. To service the command, the web server 122 may communicate with other software components 124 to perform operations on a database or data store 126 including the data storage system configuration information. Additionally, the other software components 124 may include components which use polling or other techniques to gather state and configuration data regarding the current configuration and status of the data storage system 102. For example, the data storage system 102 may include hardware components as described in connection with FIGS. 1 and 2 and additionally include other software which monitors and collects information regarding the data storage system (e.g., changes in the status of particular physical entities change over time, information regarding the addition and removal of physical entities such as storage devices, fans, power supplies and the like) and populates the data store 126 with any required updates for the data storage system configuration data stored therein. When servicing a command using non-simulation mode, the command may be serviced using the actual data storage system configuration data of data store 126.

As one use of techniques herein, any command where software included in the runtime stack when servicing the command in non-simulation mode is not operational or otherwise available for execution, such command may be serviced in simulation mode. With reference to FIG. 3, the runtime path or stack for non-simulation mode for issuing a command may be represented by the 102, 104, 112, 124 and 126. The return path may be a reverse traversal of the foregoing path associated with issuing the command. The runtime path or stack for simulation mode for issuing a command may be represented by the 102, 104, and 106. The return path may be a reverse traversal of the foregoing path associated with issuing the command. A new feature or new functionality may be added to the GUI of the data storage management software and such functionality may not yet be fully implemented in software of the non-simulation mode and associated runtime stack below that of the API code 104 receiving the command. In this case, commands associated with the new feature may be serviced using the simulator 106.

As another example, there may be a newly supported hardware entity, such as new physical device or drive type, of the data storage system 120. It may be that all necessary software of the data storage system 120 is not yet implemented to support this new physical drive type in connection with data storage system management and configuration. In this manner, functionality in connection with the GUI 102 to perform operations using this new drive type may be tested using the simulator 106. However, functionality of the GUI 102 in connection with other physical drive types may be performed in non-simulation mode. More generally, software components which are included in the runtime stack above the point at which the simulator 106 plugs into the runtime stack may be tested using the simulator 106 even if other software components below the point at which the simulator 106 plugs into the runtime stack are not yet implemented.

Although the simulator and associated functionality are illustrated as being included in the client 110, the simulator and associated functionality may be embodied in one or more other software components on the management system or any other suitable system. It should be noted that although techniques are described herein for use with a data storage system 120, more generally the techniques herein may be used with a server servicing a command request for a client.

Figure 4:
FIG. 4 is an example of command requests that may be included in an options file to disable simulation mode in an embodiment in accordance with techniques herein.

Referring to FIG. 4, shown is an example 200 of information that may be specified for use with techniques herein to disable simulation mode for command requests. The information in the example 200 may be specified as the options 113 of FIG. 3 provided as an input to the simulator 106. The example 200 may identify one or more command requests such as may be included in a file. For all command requests identified, simulation mode processing may be disabled if such simulation functionality is embodied in the simulator (e.g., if the simulator is capable of simulating the command request). Otherwise, if the simulator 106 does not include functionality to simulate the particular command request (e.g. is not capable of simulating the command request), specifying the command request in the options 113 may have no effect on whether the command is serviced via simulation or non-simulation mode. If the simulator includes functionality for simulating a command request not identified in the options of 200, by default, simulation for the command request is enabled (e.g., the command request is serviced by simulation).

The example 200 indicates, for example, that simulation mode is disabled for command request 1, command request 3 and command request N if the simulator is capable of simulating such command requests. Assuming that command request 2 is not identified in the information of 200, simulation of command request 2 is performed provided that the simulator is capable of performing simulation for this particular command request, otherwise, command request 2 is serviced in non-simulation mode. As described elsewhere herein, simulation of a command request may be performed by the simulator 106 using simulated configuration data and simulating processing performed by the data storage system to service the command request.

Generally, an embodiment may provide an options file including the information of the example 200 for possible command requests issued by the GUI 102 to the API code 104. The options file may be read in at runtime by the simulator thereby allowing for enabling/disabling use of simulation mode or non-simulation mode without rebuilding other software. Thus, in some embodiments, the data storage management software may be installed, loaded and executing on the management system. At a first point in time, a first set of options may be read in from a first options file whereby the options file does not identify command request 1 (such as issued by a call from the GUI to the code of the API) as having simulation mode disabled. Thus, all instances or requests to perform command request 1 are performed using simulation mode provided that the simulator 106 is capable of simulating command request 1. At a second later point in time, the options file may be modified to indicate that the simulator or simulation mode is disabled for use with any requests to perform command request 1 thereby indicating that any requests for command request 1 are serviced using non-simulation mode. Thus, all instances or requests to perform command request 1 may be performed using non-simulation mode independent of whether the simulator 106 is capable of simulating command request 1. The data storage management software may be again be launched and executed after this second point in time. The data storage management software may read in the updated options file and now service any requests for command request 1 using non-simulation mode. Generally, command requests issued by the GUI to the API code may have a format of:

Command object type (parameter(s))

where

"Command" may be a command or operation requested for a particular command or operation type (e.g., GET, UPDATE, CREATE, DELETE);

"object type" identifies one of the object types of the object model, and

"parameter(s)" identifies any one or more parameters for the command. It may be that the command has no parameters.

Commands or operations may be generally partitioned into two classifications—GET and SET operations. GET operations may generally refer to commands which request retrieval of information that is returned up the runtime call stack (e.g., read operation where request is to return data, based on the optional parameter(s), to the Command layer). An example may be the Get list command to obtain a list of information for one or more objects in accordance with the specified object type and parameter(s). SET operations may generally refer to commands which request that information on the server be updated based on data included in the request (e.g., create a new object of a particular type, modify or update an attribute of an existing object of a particular type, delete an existing object of a particular type, and the like). The particular syntax and commands may vary with embodiment. With a SET command, the parameters may include name-value pairs where each pair may represent an object property and a value to be assigned to the property. For example, SET LUN (ID=5, PROP_A=V1) may be a request to set the property "PROP_A" to the value V1 for the LUN object having ID=5. As another example, a command may create a snapshot of a LUN object such as Create_SNAPSHOT LUN (ID=5, ...) which may return a handle to the created snapshot. Examples of object types may include different types identifying different hardware and/or software entities in the data storage configuration and its object model. For example, object types may include LUN or logical device, physical device (PD), storage group (SG), RAID group, and the like. Further examples of commands, objects and properties are described in more detail elsewhere herein.

Such command requests as issued from the GUI to code of the API may be further transformed, processed, or mapped in accordance with the particular commands, parameters, and the like, supported for use with other lower software layers in the runtime stack or path.

It should be noted that the general classification of SET commands noted above may be implemented in an embodiment which includes commands for CREATE, UPDATE and DELETE rather than a SET command which may perform any/all such operations of create, update and delete with respect to identified object types and parameters provided. Thus, commands may be characterized as being a request to perform a particular type of operation where the type may be any of GET, CREATE, UPDATE or DELETE. Alternatively, an embodiment may implements functionality associate with CREATE, UPDATE and DELETE operations using a single type referred to as SET.

Command requests may include the following information: Command, object type, and optionally one or more parameters. Based on this and with reference to FIG. 4, the information in the options 113 may identify a command request by specifying any of the following:

COMMAND TYPE (e.g., alone with object type and parameters)—thereby specifying to disable simulation mode for all command requests including this command type;

COMMAND TYPE, OBJECT TYPE (e.g., without parameters)—thereby specifying to disable simulation mode for all command requests including the combination of command type and object type; or COMMAND TYPE, OBJECT TYPE, one or more parameters—thereby specifying to disable simulation mode for all command requests including the combination of command type, object type, and the one or more parameters.

Thus, the options may provide varying levels of granularity of control by which an option may be specified to disable simulation mode for command requests.

It should be noted that if the option indicated in the options file as FIG. 4 is to disable simulation mode for a command request for which functionality is not available or included in the simulator, then the disable simulation mode option may be ignored and presumed that the command request is serviced in non-simulation mode by the data storage system. In such instances where the simulation mode is disabled with respect to a command request or the simulator otherwise does not include support to simulate the command request, it may be presumed that the data storage system is able to processing the command request. If not, an error may be returned by the data storage system when the command request is sent for processing in accordance with non-simulation mode.

As a further example, consider the GUI issuing a command request such as using an API call to code of the API to get a list of LUNs currently defined in the data storage system The GUI may need such information to be displayed on a UI. Additionally, for each LUN in the list, the GUI may need only selected LUN object properties, a list of PDs providing the LUN's physical storage, and only selected PD object properties for the PDs on the list. The GUI may issue a command request such as GET LUN ("name", "LUN_ID", PD.ID, PD.CAPACITY)
to obtain, for each currently configured LUN, the LUN properties "name" and "LUN_ID" (LUN identifier). Additionally, each LUN has a list of one or more associated PD objects. For each such PD, return the PD's ID (e.g., denoted as PD.ID) and capacity (e.g., denoted as PD.CAPACITY). In this example, the parameters of embedded or associated objects are denoted using the "." notation indicating a reference to another embedded object of type PD. It should be noted that although only a single level of embedded object references are illustrated above, an embodiment may allow a parameter to include multiple embedded object reference levels.

Figure 5:
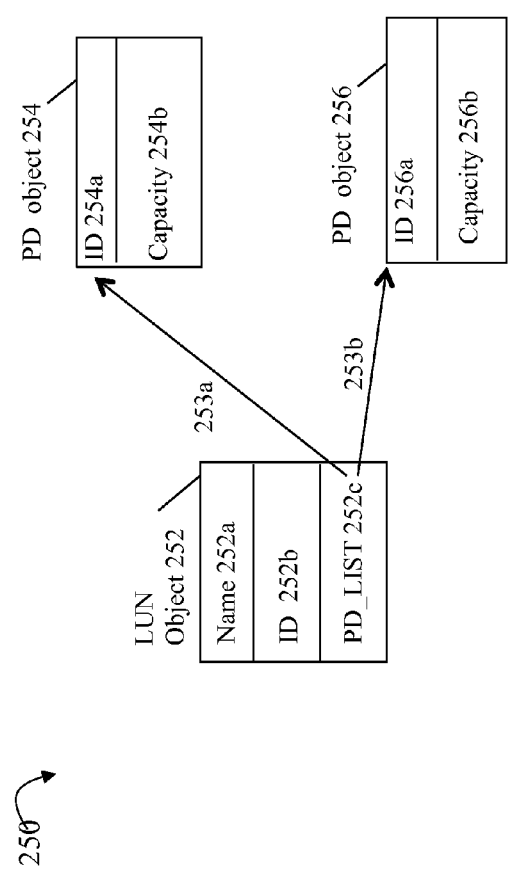
FIG. 5 is an example of configuration data that may be used in an embodiment in accordance with techniques herein.

Referring to FIG. 5, shown is an example representation of the objects for a single LUN. The example 250 includes LUN object 252 comprising the properties name 252a, ID 252b and PD_LIST 252c (list of PDs providing backing physical storage for LUN). The associations between LUN object 252 and its two related PD objects 254, 256 are illustrated with arrows 253a, 253b. PD object 254 includes properties ID 254a (e.g., unique identifier for the PD) and Capacity 204b (e.g., storage capacity of the PD). Although FIG. 5 shows information for only a single LUN object, such information may be a representation of objects included in the client object model for each LUN. For the above-mentioned Get command, all LUN properties 252a-c are requested for each LUN. Additionally, for each PD identified by property 252c, the PD properties ID and capacity are also requested. Embedded or associated objects may be implemented using arrays, pointers, and/or any other suitable technique known in the art. For example, a LUN may have an array of PD objects. Alternatively, the embedded or associated objects may be represented using pointers or other techniques to reference the association between the LUN and its backing PDs.

With reference back to FIG. 3, when the GUI 102 is starting up, one or more command requests such as the foregoing Get command may be issued to the API code 104 obtain information used to initially populate a GUI display. The API code 104 may determine at runtime in accordance with the options 113 whether this particular command request is serviced in a simulated mode whereby the simulator 106 and simulated configuration data are utilized, or whether this particular command request is serviced in a non-simulation mode whereby the request is serviced by the data storage system 120 using its actual configuration data. The options 113 may be an input to the simulator 106 and the API code 104 may inquire of the simulator 106 regarding whether a particular command request is to be serviced using simulation mode/by the simulator 106. Assume for purposes of illustration that this command is serviced in a simulation mode using the simulator 106. In this case, the data store 121 may include a set of simulated configuration data used to service the request. The set of configuration data used to simulate a data storage system configuration may describe information for one or more LUNs consistent with the representation of FIG. 4 and may also include other information for the LUNs and other objects describing physical and/or logical entities of the simulated data storage system configuration. The simulator 106 may perform processing to simulate servicing the command request as if serviced by the data storage system whereby the simulator returns the requested information for the LUNs described by the simulated data storage system configuration data. If the code of API 104 determines that the command request is not to be simulated, then the command request may be issued to the data storage system for processing in non-simulation mode whereby the current configuration data of the data storage system may include information consistent with the representation of FIG. 4. In non-simulation mode, the command request may be serviced by the data storage system using the data storage system's current configuration data. The data storage system may return to the client the requested information for the LUNs described by the current data storage system configuration data.

What will now be described is one way in which the command requests may be processed by handlers in an embodiment in accordance with techniques herein to determine whether to service the command request in a simulated mode using the simulator 106, or whether to service the command request in non-simulated mode whereby the request may be issued to the data storage system for processing in accordance with the code and actual configuration data of the data storage system.

Figure 6:
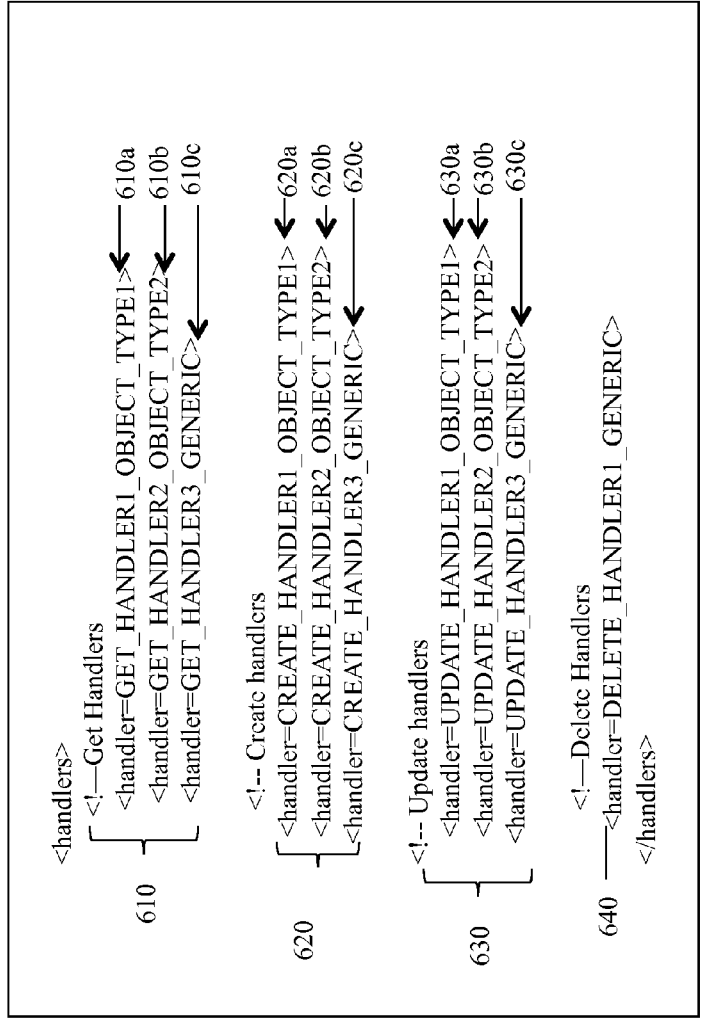
FIG. 6 is a list of simulation mode handlers that may be included in an embodiment in accordance with techniques herein.

Referring to FIG. 6, shown is an example of a list of simulation mode handlers that may be used in an embodiment in accordance with techniques herein. The list of 600 may be included, for example, a file that is read in as an input in connection with runtime processing of code of the API. The list of 600 may include specialized or customized handlers and generic or default handlers for simulating each type of operation. As described below, a handler may be specialized or customized in that it handles processing for a particular type of operation in combination with object type, or a particular type of operation in combination with a particular object type along with a particular combination of one or more parameters. Generally, if the required runtime processing steps for simulating a particular combination of operation type and object type, or combination of operation type, object type and one or more parameters requires specialized or customized processing that vary for that particular combination, then a specialized handler may be included in the list 600 for that particular combination.

Element 610 represents simulation mode handlers that may perform processing to simulate GET operation requests. Element 620 represents simulation mode handlers that may perform processing for simulating CREATE operation requests. Element 630 represents simulation mode handlers that may perform processing for simulating UPDATE operation requests. Element 640 represents the single simulation mode handler that may perform processing for simulating DELETE operation requests.

With reference to the 3 handlers of 610, element 610a may represent a customized or specialized simulation mode handler which performs processing for simulating a GET operation to get an object of OBJECT TYPE1. Element 610b may represent a customized or specialized simulation mode handler which performs processing for simulating a GET operation to get an object of OBJECT TYPE2. Element 610c may represent a generic or default simulation mode handler for simulating GET operations. The generic or default handler may handle GET operations for one or more remaining possible object types besides OBJECT TYPE1 and OBJECT TYPE2 (e.g., for object types not otherwise handled by specialized handlers 610a, 610b). For example, OBJECT TYPE 1 may be LUN and OBJECT TYPE 2 may be Storage group whereby different processing is required to construct objects of these two types in contrast to other remaining object types processed by the generic or default GET handler 610c.

With reference to the 3 handlers of 620, element 620a may represent a customized or specialized simulation mode handler which performs processing for simulating a CREATE operation to create a new object of OBJECT TYPE1. Element 620b may represent a customized or specialized simulation mode handler which performs processing for simulating a CREATE operation to create a new object of OBJECT TYPE2. Element 620c may represent a generic or default simulation mode handler for simulating CREATE operations. The generic or default simulation mode handler 620c may handle simulating CREATE operations for one or more remaining possible object types besides OBJECT TYPE1 and OBJECT TYPE2. For example, OBJECT TYPE 1 may be LUN and OBJECT TYPE 2 may be Storage group whereby different processing is required to create objects of these two types in contrast to other remaining object types processed by the generic or default CREATE handler 620c.

With reference to the 3 handlers of 630, element 630a may represent a customized or specialized simulation mode handler which performs processing for simulating an UPDATE operation to update an existing object of OBJECT TYPE. Element 630b may represent a customized or specialized simulation mode handler which performs processing for simulating an UPDATE operation to update an existing object of OBJECT TYPE2. Element 630c may represent a generic or default simulation mode handler for simulating UPDATE operations. The generic or default simulation mode handler 630c may handle simulating UPDATE operations for one or more remaining possible object types besides OBJECT TYPE1 and OBJECT TYPE2. For example, OBJECT TYPE 1 may be LUN and OBJECT TYPE 2 may be Storage group whereby different processing is required to update existing objects of these two types in contrast to other remaining object types processed by the generic or default UPDATE handler 630c.

With reference to 640, a single DELETE handler is illustrated which is a generic or default simulation mode handler for handling simulation of the delete operation for one or more object types.

In one embodiment, the simulation mode handlers of 600 may represent a prioritized list of simulation mode handlers for particular operations. The simulation mode handlers may be included in the simulator 106. At runtime, code of the API 104 may perform processing to traverse the list of simulation mode handlers in the specified order in the list 600. An inquiry may be made at runtime for each handler in the list as traversed as to whether the handler simulates processing of a command request of a particular combination of command operation type, object type and optionally one or more parameters (as may be specified in the API call from the GUI). An indication may be returned as to whether a particular simulation mode handler simulates processing for a command request having a particular combination of command operation type, object type and optionally one or more parameters. The runtime processing may traverse the list of 600 in order denoting a prioritized processing order. The first simulation mode handler indicated as simulating the command request (in accordance with the particular command operation type, object type and optionally one or more particular parameters) may be invoked to simulate the command request. Once such a positive indication is returned denoting that the first handler simulates servicing the command request, runtime processing traversal of the handler list of 600 stops. Subsequently, the first identified handler may be invoked to service the command request by simulating the data storage system and simulating processing performed by the data storage system to service the command request.

It may be that runtime processing of the list of 600 traverses the entire list and no information is returned indicating that one of simulation mode handlers simulates the particular command request including the particular command operation type, object type and optionally one or more particular parameters. In this case, it may be concluded that simulation mode should not be used to service the command request and that alternatively non-simulation mode is used to service the command request. Consistent with description herein, the command request may be serviced using non-simulation mode processing by issuing a request to the data storage system to process the command request.

In connection with the list of FIG. 6, it should be noted that multiple simulation mode handlers may be capable of (e.g., enabled) servicing the same command request. In this case, processing the list in a prioritized order results in a first of such multiple handlers queried in accordance with the prioritized order and returning a positive/yes response indicating that the first handler, if invoked, will service the command request.

Figure 7:
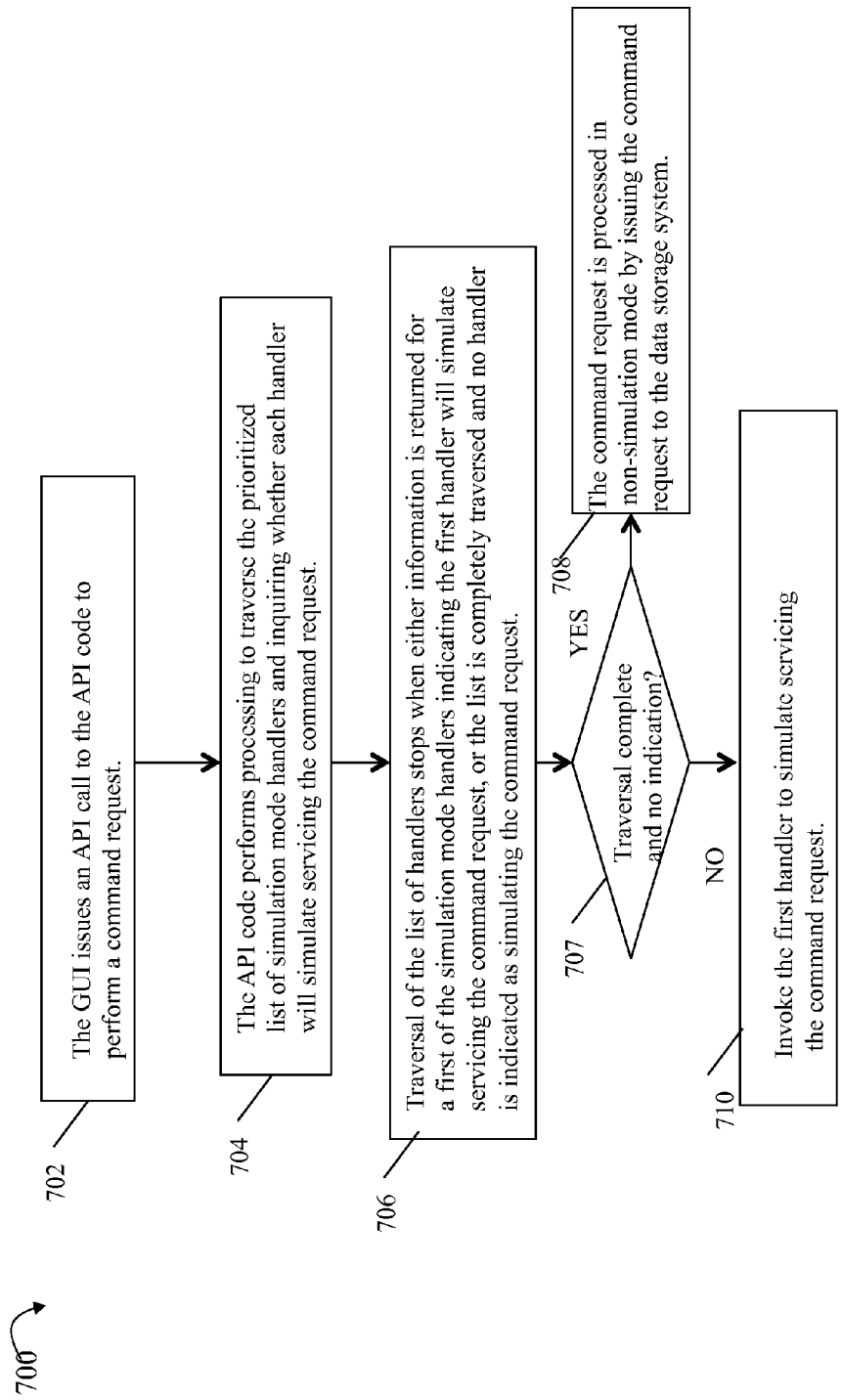
FIGS. 7 and 7A are flowcharts of processing steps that may be performed in an embodiment in accordance with techniques herein.

Referring to FIG. 7, shown is a flowchart of processing steps that may be performed in an embodiment in accordance with techniques herein. The flowchart 700 summarizes processing described above in connection with traversing the prioritized list of simulation mode handlers of FIG. 6. At step 702, the GUI issues an API call to the API code to perform a command request. At step 704, the API code performs processing to traverse the prioritized list of simulation mode handlers and inquiring whether each handler in the list will simulate servicing the command request. At step 706, the traversal of the list of handlers stops when either of the following occurs: for a first of the simulation mode handlers, information is returned indicating that the first handler will service the command request using simulation, or the entire list is traversed without receiving an indication that one of the handlers, when invoked, simulates the command request. In connection with step 706, the list of handlers may be traversed sequentially in the prioritized order denoted by the ordering of handlers in the list. If a current handler having a position in the list is queried regarding whether it will handler servicing a command request and the current handler returns true (thereby indicating it will service the command request), traversal of the list stops and the current handler may be invoked to service the command request. If the current handler returns false (thereby indicating is will not service the command request), traversal continues with the next handler in the prioritized list.

In connection with processing the list of handlers in step 706, an embodiment may choose to traverse the list and perform the inquiry as to whether each handler will service a command request in a synchronous manner whereby processing with respect to an inquiry for current handler on the list may not proceed with respect to an inquiry of a next handler in the list until the current handler has returned a response (or otherwise may have timed out and not returned a response within a predetermined time period). As a variation, an embodiment may choose to traverse the list and perform the inquiry as to whether each handler will service a command request in an asynchronous manner whereby processing with respect to an inquiry for current handler on the list may proceed with respect to an inquiry of a next handler in the list even if the current handler has not yet returned a response. In this manner with asynchronous processing, there may be multiple outstanding inquiries for which no response has been returned.

A determination is made at step 707 whether traversal of the list of handlers has completed without having received an indication that there is a simulation mode handler that will perform processing to simulate the command request. If step 707 evaluates to yes thereby denoting that traversal of the list completed and information returned indicates that none of the simulation mode handlers will service the command request via simulation, control proceeds to step 708 where the command request is processed in non-simulation mode by issuing the command request to the data storage system. Otherwise, if step 707 evaluates to no (thereby denoting that traversal of the list in step 706 was terminated due to information being returned indicating that a first one of the simulation mode handlers will service the command request via simulation), that first handler is invoked in step 710 to service the command request by simulation.

It should be noted that the traversal of the list of FIG. 6 may start with the first handler in the list and walk through the list from top to bottom issuing the inquiry with respect to each handler as noted above. Alternatively, an embodiment may otherwise commence the inquiry with the first handler of a particular command type if all handlers of each particular command type are grouped together in the list. For example, the code performing the runtime traversal may have knowledge regarding the naming convention of the handlers or otherwise be informed regarding the particular lines including handlers for the different command types. In this manner, the processing of FIG. 7 may be performed with respect to a smaller portion of the simulation mode handlers for the particular command type (e.g., GET, CREATE, UPDATE or DELETE) of the command request.

As simulation mode handlers are added to the simulator, such additional simulation mode handlers may be added to the list as in FIG. 6. In a similar manner, as simulation mode handlers are removed from the simulator, such additional simulation mode handlers may be remove from the list of FIG. 6.

In accordance with techniques herein, the simulator 106 may read in the options 113 and may accordingly store information in memory used to determine whether a particular command request is processed in simulation mode or non-simulation mode. For example, with reference back to FIG. 6, code of the GET handler for OBJECT TYPE 1 610a may include code for processing all GET operations for OBJECT TYPE 1. Code of the handler 610a may be encoded with logic to determine whether simulation mode is disabled for all GET operations of OBJECT TYPE 1, or for particular combinations of GET, OBJECT TYPE 1 and certain parameters (as may be specified in accordance with the options 113). For example, it may be that command requests to GET OBJECT TYPE1 with PARAMETER 1 are disabled for simulation mode and that all other command requests having a different combination of GET OBJECT TYPE 1 with one or more other PARAMETERS other than PARAMETER 1 do not have simulation mode disabled (e.g., such other commands requests are simulated if the simulator is capable of performing such simulation).

Thus, whether a command request has simulation disabled and whether a command request is capable of being performed by a handler may vary in accordance with the combination of command type, object type and any one or more parameters.

As described above, processing may be performed to inquire of each handler whether or not the handler simulates a particular command request. In such an embodiment, a Boolean value of true or false may be returned in response to the inquiry whereby true may denote that handler, if invoked, will perform simulation of the command request. Thus, returning a value of true may denote that simulation mode has not been disabled for the command request and also that the handler is able to, or capable of, simulating the command request (e.g. functionality is included in the handler to simulate the command request). A return value of false with respect to a particular command request may denote that simulation mode is either disabled for the particular command request and/or that the handler is not capable of performing simulation for the command request (e.g. the handler does not include functionality capable of simulating the command request). In other words, receiving a return value of false in response to the above-mentioned inquiry of a particular simulation mode handler with respect to a particular command request denotes that, if the simulation mode handler is invoked, that handler will not simulate servicing the command request. Receiving a return value of true in response to the above-mentioned inquiry of a particular simulation mode handler with respect to a particular command request denotes that, if the simulation mode handler is invoked, that handler will simulate servicing the command request. With reference to FIG. 7, receiving the return value of true results in stopping further list traversal inquiries and also performing step 710. Receiving a value of false results in the inquiry continuing with subsequent handlers on the list and, if all handlers in the list return false, step 708 is performed.

As a variation, an inquiry may be made regarding a simulation mode status with respect to a particular simulation mode handler and command request. Rather than return a Boolean value in response to the inquiry, a response to the inquiry may denote one of three states:

yes—the handler can handle, or is capable of handling, simulation of the command request, no—the handler cannot handle, or is incapable of handling, simulation of the command request such as due to functionality not being implemented, and live/simulation mode disabled—the handler can handle, or is capable of handling, simulation of the command request. However, simulation mode for the command request is currently disabled.

In this case, a return value of no or live/simulation mode disabled may indicate that the particular simulation mode handler will not simulate the command request is the handler is so invoked.

What will now be described is processing that may be performed in an embodiment in accordance with techniques herein whereby a simulation mode handler may return a response denoting one of three states. As noted above, the response may be returned by the handler responsive to an inquiry as to whether the handler will handle servicing of a command request. As with the handlers that return Boolean values, the inquiry may be issued to each simulation mode handler with respect to a particular command request. If a response received from a handler denotes the yes/can handler state described above, traversal of the list of handlers stops and the handler that returned the yes is invoked to service the command request. If a response received from a handler denotes the no/cannot handle state described above, traversal of the list of handlers continues with subsequent handlers in the prioritized list. If a response received from a handler denotes the live/simulation mode disabled state described above, traversal of the list of handlers stops and the command request is processed in the non-simulation mode by issuing the command request to the data storage system (e.g., server).

Figure 7A:
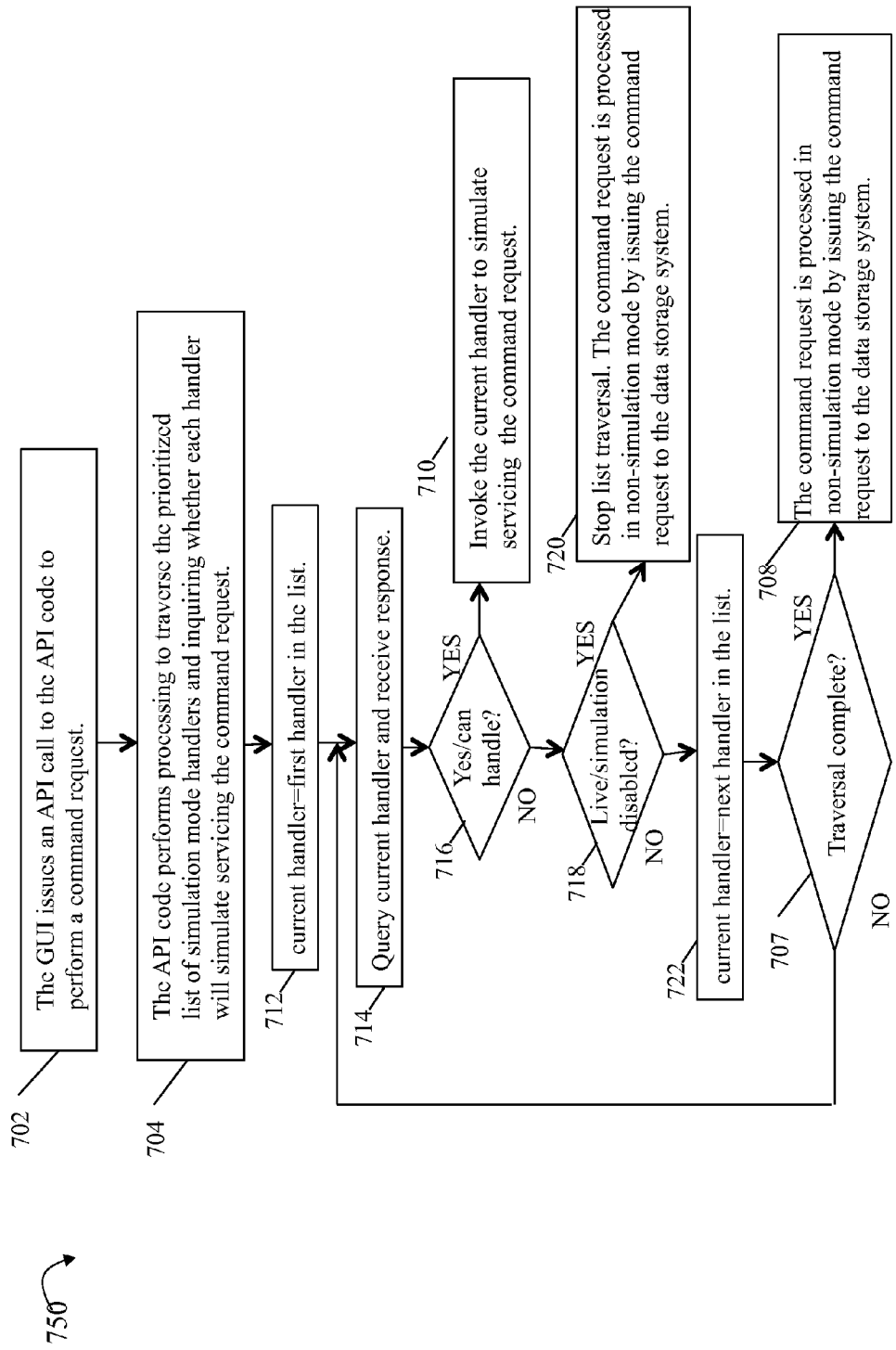

Referring to FIG. 7A, shown is a flowchart 750 of processing steps that may be performed in an embodiment in accordance with techniques herein whereby the handlers may return one of the three states described above. Steps 702, 704, 707, 708 and 710 of FIG. 7A are similar to steps of FIG. 7 having the same elements numbers. In flowchart 750, steps 702 and 704 are performed as described as in connection with FIG. 7. At step 712, current handler is assigned the first handler in the prioritized list (e.g., as illustrated in FIG. 6). At step 714, the current handler is queried as to whether the current handler will simulate the command request. A response to this inquiry is received in step 714 whereby the response may indicate one of the 3 states described above of yes, no or live/simulation mode disabled. At step 716, a determination is made as to whether the response indicates yes, that the current handler can handle simulating the command request. If step 716 evaluates to yes, control proceeds to step 710 to invoke the current handler to simulate servicing the command request. If step 716 evaluates to no, control proceeds to step 718 where a determination is made as to whether the current handler's response indicate the live/simulation mode disabled state. If step 718, evaluates to yes, control proceeds to step 720 to stop traversal of the list and not make any further inquiry of subsequent handlers on the list. In step 720, the command request is then processed in non-simulation mode by issuing the request to the data storage system. If step 718 evaluates to no (meaning that the response indicates the no/cannot handler state above), processing proceeds to step 722 where current handler is assigned the next handler in the list. At step 707, a determination is made as to whether traversal of the list is complete. If so, control proceeds to step 708. Otherwise if step 707 evaluates to no, control proceeds to step 714 to query the current handler.

Figure 8:
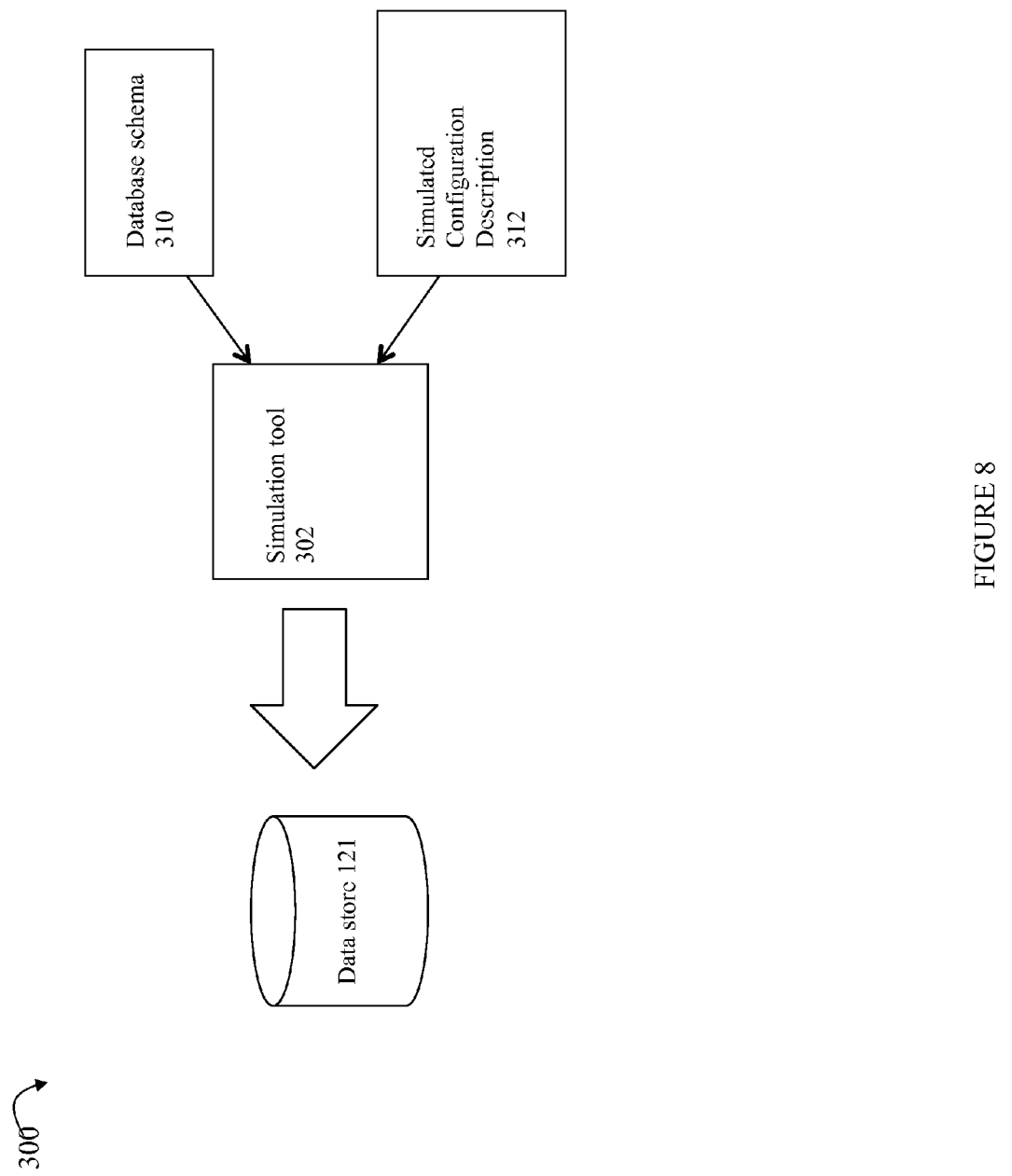
FIG. 8 is an example of inputs that may be provided to the simulation tool to generate simulated configuration data used to populate the database of a data store in an embodiment in accordance with techniques herein.

Referring to FIG. 8, shown is an example 300 illustrating components that may be used in an embodiment in accordance with techniques herein. The example 300 includes a database schema 310, simulated configuration description 312, simulation tool 302 and data store 121. The simulation tool 302 may be a software component that generates data used to populate the data store 121 directly. Thus, the simulation tool 302 may generate simulated data storage configuration data stored in the data store 121. As described above, for example with reference to FIG. 3, the data store 121 may be a database of configuration data used by the simulator 106 in simulating a configuration of a data storage system and used in connection with simulating processing as if performed by a data storage system in connection with servicing a data storage management request.

Described in following paragraphs is one exemplary way in which configuration data may be obtained for use by the simulator 106 through generating the data using the simulation tool 302. More generally, such configuration data of the data store 121 used by the simulator 106 when simulating servicing of a command may be obtained using any suitable technique. For example, techniques herein may be used to generate a particular set of configuration data including desired information. As an alternative, an embodiment may port or copy a set of configuration data (or portions thereof) of an existing data storage system, such as from data store 126, to the data store 121 for use by the simulator 106. It should also be noted that since techniques herein may provide for simulating a portion of less than all supported or possible commands issued by the GUI 102, the configuration data of 121 for use by the simulator 106 may represent a set of configuration data sufficient for use with the particular commands and operations to be simulated. For example, the configuration data of 121 may not represent a complete data storage system configuration but may include configuration data for a partial configuration sufficient for use with the command requests being simulated.

In some embodiments as described in following paragraphs, the data store 121 may be a database or otherwise include a database of configuration data for use by the simulator 106. However, it should be noted that the data store 121 may be more generally any suitable data container capable of storing the configuration data for use by the simulator 106.

The simulation tool 302 may use inputs including a database schema 310 and a simulated data storage configuration description 312. The database schema 310 may be characterized as a template or metadata defining the structure of tables included in the database of data store 121 (e.g. providing the schema definition). For example, the database schema 310 may be a data file describing one or more tables of the database for which the simulation tool 302 generates simulated configuration data. For example, the database schema 310 may describe the name and format of a database table including the number of columns of the table, the type of data included in each column, and the like. In one embodiment as described herein using an object-based model for the data base of data store 121, a row of a table may represent an object. Each column or field of the row may represent an attribute or property of the object.

It should be noted that an embodiment of the simulation tool may use other suitable means known in the art besides files to provide inputs as illustrated in FIG. 8 to the simulation tool. For example, an embodiment may use a user interface such as with an interactive dialog or wizard to obtain user inputs in connection with describing the simulated data storage configuration.

Figure 9:
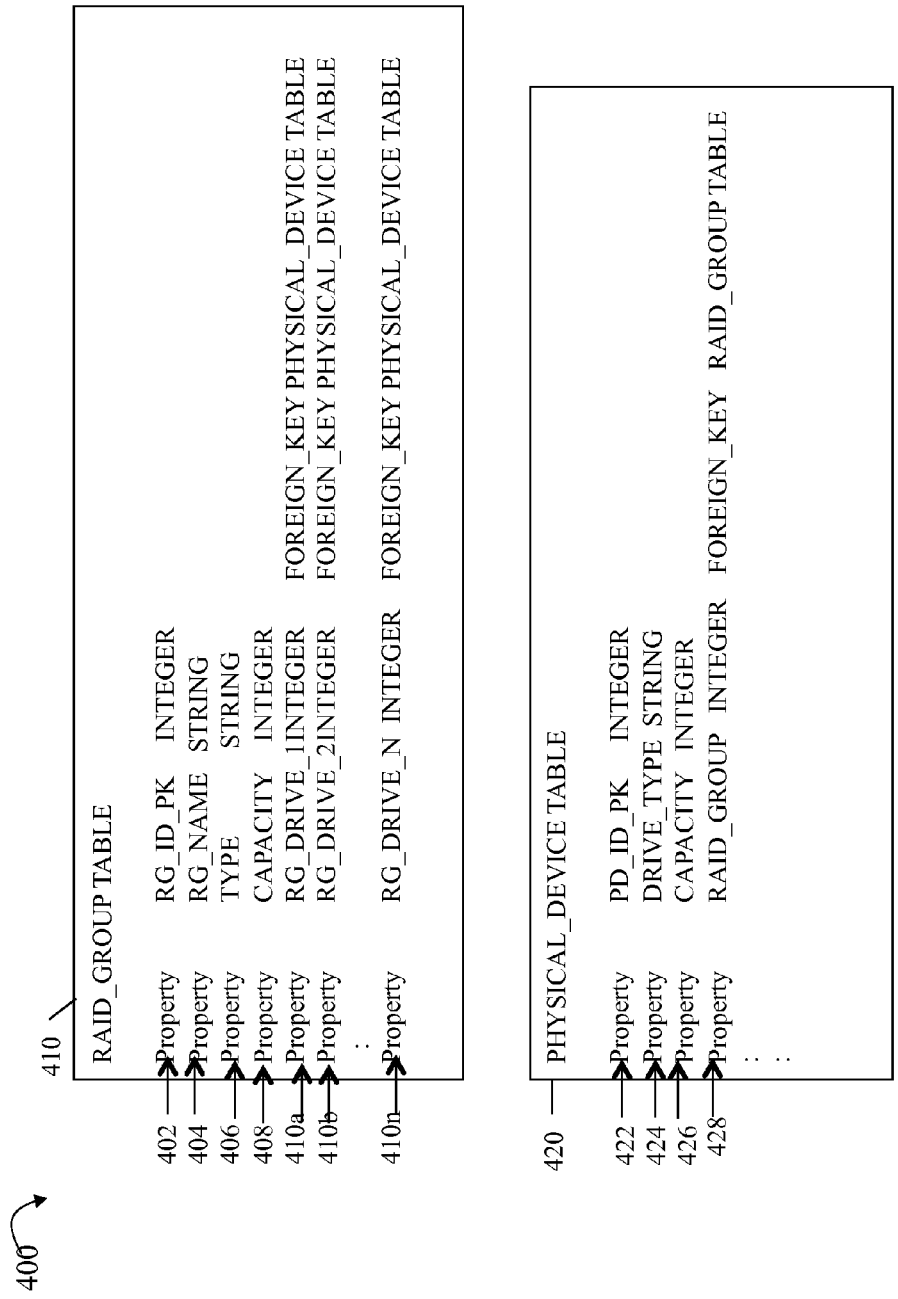
FIG. 9 is an example of database schema that may be used in an embodiment in accordance with techniques herein.

Referring to FIG. 9, shown is an example representation of information that may be included in a database schema provided as an input to the simulation tool in an embodiment in accordance with techniques herein. FIG. 9 provides additional detail regarding information that may be included in input 310 of FIG. 8. The particular contents of the information included in the various inputs described in FIGS. 9 and 10 may vary with the particular set of configuration data and entities to be described by the generated configuration data.

The example 400 includes only two exemplary tables of the database that may be described by the schema. As will be appreciated by those skilled in the art, the database schema may include a similar description for each table of physical and/or or logical entities of the database. The example 400 includes a description 410 for a RAID_GROUP TABLE and a description 420 for a PHYSICAL_DEVICE TABLE.

Element 410 may describe the properties included for each RAID GROUP object included in the RAID_GROUP TABLE. As known in the art, a RAID (redundant array of independent disks) group is a logical grouping of multiple physical drives. Data may be distributed across the physical drives of the RAID group based on a defined RAID level or configuration. Different RAID levels are known in the art such as, for example RAID-0 (e.g., block level striping without parity or mirroring thereby providing no redundancy), RAID-1 (e.g., mirroring without parity or striping whereby data is written identically to two drives providing a mirrored set), RAID-5 (e.g., block level striping with distributed parity), RAID-6, (e.g., block-level striping with double distributed parity), and the like. Thus, a RAID group may include one or more physical device or drive (PD) members depending on the RAID-level. In the example 410, each RAID group includes the following properties:

RG_ID_PK 402 of type integer denoting an identifier uniquely identifying this particular object or row of the table 410. This is the primary key of the table 410.

RG_NAME 404 of type string denoting a named identifier for the RAID group described by this object.

TYPE 406 of type string denoting the RAID-level such as RAID-0, RAID-1, RAID-5, RAID-6 and the like.

CAPACITY 408 of type integer denoting the capacity of the RAID group described buy this object. The capacity may be in storage units such as GBs.

RG_DRIVE_1 through RG_DRIVE_N 410a-410n, each of type integer and each denote an instance or object representing a PD that is a member of the RAID group described by this object. Each of these properties 410a-n is further described in the schema by "FOREIGN_KEY PHYSICAL_DEVICE TABLE" identifying that each property 410a-n is a foreign key used to index into, and identify an instance of, a PD in the PHYSICAL DEVICE TABLE described by 420. The foregoing foreign keys may be used to define associations or relationships between entities in the tables 410, 420. Generally, a foreign key included in one table may represent a primary key with respect to another different database table.

Element 420 may describe the properties included for each PHYSICAL DEVICE object included in the PHYSICAL DEVICE TABLE. Each physical device described by an entry or row in the table 420 may include the following properties:

PD_ID_PK 422 of type integer denoting an identifier uniquely identifying this particular object or row of the table 420. This is the primary key of the table 420.

DRIVE_TYPE 424 of type string denoting a type of the physical drive. For example, a PD may be any one of a set of multiple types of drives supported by a data storage system such as Fibre channel 10K RPM rotating disk drives (FC_10K), Fibre channel 15K RPM rotating disk drives (FC_15K), SATA rotating disk drives (SATA), flash or solid state storage devices (FLASH), and the like.

CAPACITY 426 of type integer denoting the physical storage capacity of the PD. The capacity may be in storage units such as GBs (gigabytes).

RAID_GROUP 428 of type integer denoting the particular RAID group to which this PD is a member. It should be noted that property 428 may be null or empty if the PD is not included or configured into any RAID group. Additionally, "FOREIGN_KEY RAID_GROUP TABLE" denotes that property 428 is a foreign key used to index into, and identifies an instance of, a RAID group object in the RAID GROUP TABLE described by 410. The foreign key of 428 may be used to define the RAID-GROUP-PD association between entities in the tables 410, 420.

Figure 10:
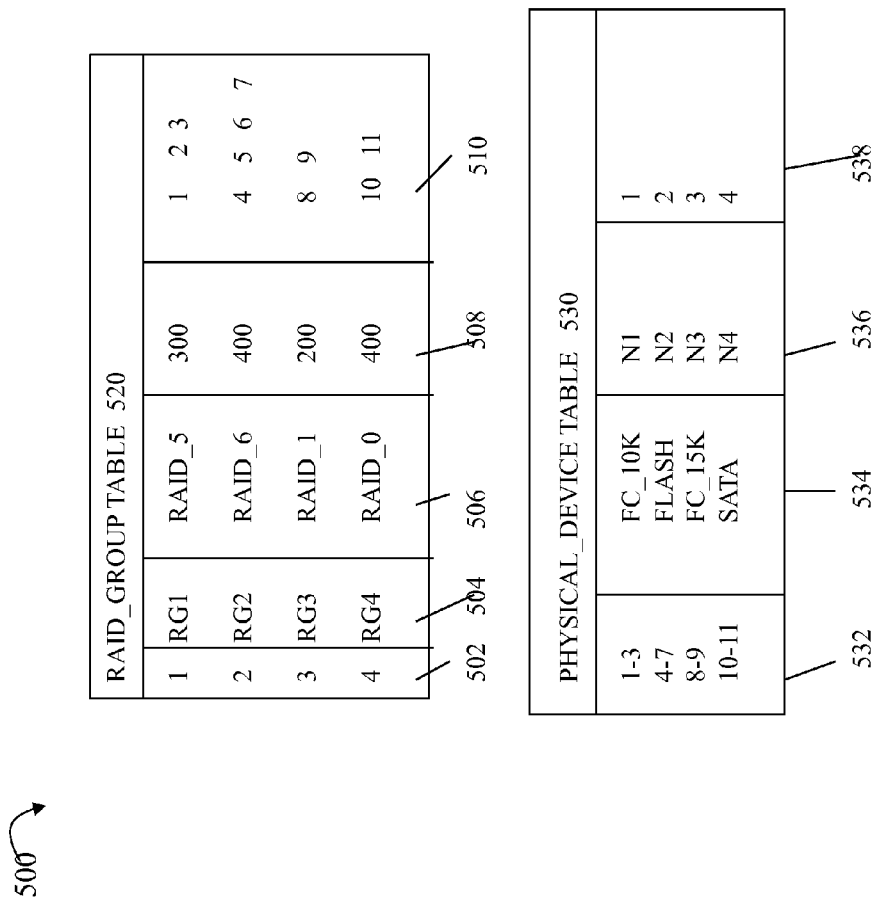
FIG. 10 is an example of a simulated configuration description that may be used to specify objects and property values in an embodiment in accordance with techniques herein.

Referring to FIG. 10, shown is an example of a simulated configuration description that may be provided as an input to the simulation tool in connection with generating simulated configuration data used to populate the database of data store 121. FIG. 10 provides additional detail regarding information that may be included in input 312 of FIG. 8. The example 500 includes data used to specify object instances of RAID groups of the RAID GROUP TABLE 410 and PDs of the PHYSICAL DEVICE TABLE 420. Thus, the data storage configuration description in the example 500 may provide values for properties of RAID group objects and physical device objects of the simulated data storage configuration.

The example 500 includes element 520 representing information that may be specified for RAID group objects of the simulated configuration and element 530 representing information that may be specified for PDs of the simulated configuration. Element 520 includes property values in accordance with the schema 410 of FIG. 9 which define 4 RAID groups. Each RAID group is represented as an object having a row of information in 520. Columns 502, 504, 506, and 508, respectively, represent values of properties 402, 404, 406 and 408 for each of the 4 RAID groups. The columns represented by 510 denote the particular PDs for each RAID group (e.g., corresponding to properties 410a-410n whereby a RAID group may have a varying number of PDs depending on the particular RAID group level denoting by the TYPE property in column 506.) For example, the first row of table 520 identifies a first RAID group, having a primary key or identifier of "1", having the name "RG1", configured to have a level of RAID-5, with a capacity of 300 GBs. The first RAID group has three PDs denoted by PD identifiers 1, 2, and 3 in column 510, first row of table 520. Each of the foregoing PD identifiers 1, 2 and 3 may correspond to, or be associated with, an object in the PHYSICAL DEVICE TABLE 530 having the PD identifier as the primary key. In this case, the first RAID group having a primary key or identifier of "1" (e.g., the first row of table 520) is associated with the first 3 rows of table 530. In a similar manner, associations are specified for each of the remaining three RAID groups denoted by the remaining 3 rows of table 520.

Element 530 includes property values in accordance with the schema 420 of FIG. 6 which define 11 PDs. Each PD is represented as an object having a row of information in 530. Columns 532, 534, 536, and 538, respectively, represent values of properties 422, 424, 426 and 428 for each of the 11 PDs. The column 538 denotes the particular RAID group to which the PD is associated. In this example, the table 530 includes property values for PDs using a short hand notation in column 532 whereby the row of property values in columns 534, 536 and 538 applies to each PD denoted by an identifier in the range of column 532. For example, row 1 of table 530 includes "1-3" in column 532 denoting that columns 534, 536 and 538 define simulated configuration information for 3 PDs having identifiers or primary keys of 1, 2 and 3 in table 530. The value of "1" in column 538 of row 1 of table 530 denotes that each of the first 3 PDs are included in (associated with) the first RAID group denoted by row 1 of table 520.

The example description of the simulated configuration data in FIG. 10 provides a representation of a complete description of all property values included in the schema of FIG. 9. Alternatively, the description of the simulated configuration data in FIG. 10 may include an incomplete specification of data such as by omitting particular columns or property values. For example, with reference to FIG. 10, the data storage configuration description for the RAID GROUP table 520 may omit values of columns 502 and 510 and may omit specifying any values for PDs as represented by table 530. An embodiment may have the simulation tool automatically specify any needed default values to provide a complete, valid and consistent set of simulated configuration data. In this manner, the inputs for property values in the description may be used to override any default values which would otherwise be automatically supplied by the simulation tool. For example, continuing with the above-referenced example where only values of columns 504, 506 and 508 are specified in the simulated configuration description, the simulation tool may automatically provide values for 502 and may automatically select a default number of PDs for each RAID group object depending on the particular RAID type or level denoted by column 506. Additionally, the simulation tool may automatically provide property values of table 530 denoting the particular PDs included in each RAID group.

With reference back to FIG. 8, it should be noted that the simulation tool may perform processing in connection with validating the simulated configuration description 312 as consistent with respect to the database schema 310. Additionally, the simulation tool may perform processing in connection with one or more other validation rules for ensuring a consistent and complete simulated data storage configuration. For example, the simulation tool may perform validation to determine whether a suitable number of PDs have been specified for a RAID group given the particular TYPE in column 506. For example, RAID-0 and RAID-1 may require a minimum of two PDs. Such additional validation rules may be encoded internally within coded logic of the simulation tool and/or represented as a set of extracted rules which may be read as another input (not illustrated in FIG. 8) to the simulation tool 302. Such validation rules may relate to other aspects of semantic constraints which may not be otherwise represented in the database schema.

The example illustrated in connection with FIGS. 9 and 10 is one way in which such data may for a simulated configuration may be represented and generated for use with techniques herein.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium (also referred to as computer readable medium) having any one of a variety of different forms including volatile and nonvolatile, removable and non-removable media implemented in any method or technology for storage of information such as computer readable instructions, data structures, program modules or other data. Computer-readable storage media, or computer-readable medium, includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can be accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of servicing one or more command requests comprising:
   receiving a first command request;
   determining whether to simulate servicing the first command request using a simulator or whether to service the first command by processing in accordance with a non-simulation mode, wherein said first command request is one of a plurality of command requests, and a first portion of the plurality of command requests are simulated whereby the first portion of commands are serviced using the simulator and a second portion of the command requests are serviced in the non-simulation mode; and
   servicing the first command request in accordance with said determining, wherein the first command request is a command to perform any of a get operation returning information regarding a data storage system configuration to a user interface, a create operation to create a new instance of an entity in a data storage system configuration, an update operation to update an existing instance of an entity in a data storage system configuration, and a delete operation to delete an existing instance of an entity in a data storage system configuration.

2. The method of claim 1, wherein said determining is performed at runtime during execution of first code receiving the first command request.

3. The method of claim 1, wherein an option is specified for one command request of the second portion indicating that simulation mode for said one command request is disabled.

4. The method of claim 3, wherein the first command request is said one command request and said simulator includes code for simulating said first command request and wherein said determining uses said option to determine that the first command request is not serviced by simulation using the simulator and that the first command request is serviced by issuing the command to a server for processing in the non-simulation mode.

5. The method of claim 4, wherein the server is a data storage system and the first command request is issued by the user interface of a data storage system management application.

6. A method of servicing one or more command requests comprising:
   receiving a first command request;
   determining whether to simulate servicing the first command request using a simulator or whether to service the first command by processing in accordance with a non-simulation mode, wherein said first command request is one of a plurality of command requests, and a first portion of the plurality of command requests are simulated whereby the first portion of commands are serviced using the simulator and a second portion of the command requests are serviced in the non-simulation mode; and
   servicing the first command request in accordance with said determining, wherein said simulator includes code for simulating the first portion of command requests and for simulating at least one command request of the second portion whereby simulation for said at least one command request is disabled in accordance with an options file identifying that simulation mode is disabled for said at least one command request.

7. The method of claim 1, wherein each of the plurality of command requests is a request to perform a command with respect to an object type and one or more optional parameters.

8. A method of servicing one or more command requests comprising:
   receiving a first command request;
   determining whether to simulate servicing the first command request using a simulator or whether to service the first command by processing in accordance with a non-simulation mode, wherein said first command request is one of a plurality of command requests, and a first portion of the plurality of command requests are simulated whereby the first portion of commands are serviced using the simulator and a second portion of the command requests are serviced in the non-simulation mode; and
   servicing the first command request in accordance with said determining, wherein the simulator simulates servicing command requests in connection with performing a data storage management operation, said simulator performing processing to simulate a data storage system servicing command requests in accordance with simulated configuration data simulating at least some entities of a current configuration of the data storage system.

9. The method of claim 8, wherein the simulated configuration data uses an object model and includes an object for a plurality of logical and physical entities of the data storage system being simulated.

10. The method of claim 9, wherein the object model includes a plurality of object types, each of said plurality of logical and physical entities being one of the plurality of object types, and wherein said plurality of object types includes any of a physical storage device, a logical storage device, a RAID (redundant array of independent disks) group, a storage group, a physical component of the data storage system being simulated, and a logical component of the data storage system being simulated.

11. A method of servicing one or more command requests comprising:
receiving a first command request;
determining whether to simulate servicing the first command request using a simulator or whether to service the first command by processing in accordance with a non-simulation mode, wherein said first command request is one of a plurality of command requests, and a first portion of the plurality of command requests are simulated whereby the first portion of commands are serviced using the simulator and a second portion of the command requests are serviced in the non-simulation mode; and
servicing the first command request in accordance with said determining, wherein said determining whether to simulate the first command request using a simulator or whether to service the first command by processing in accordance with a non-simulation mode further includes:
processing a prioritized list of simulation mode handlers, said processing including inquiring whether at least one of the simulation mode handlers simulates the first command request.

12. The method of claim 11, wherein inquiries are made regarding whether simulation mode handlers of the prioritized list simulate the first command request and said prioritized list is processed until either an indication is received that a first of the simulation mode handlers performs simulation for the first command request or an indication is received for each of the simulation mode handlers in the prioritized list denoting that said each simulation mode handler does not perform simulation for the first command request.

13. The method of claim 12, wherein an indication is received that a first of the simulation mode handlers performs simulation for the first command request, and processing is performed to simulate the first command request by invoking the first simulation mode handler.

14. The method of claim 12, wherein an indication is received for each of the simulation mode handlers in the prioritized list denoting that said each simulation mode handler does not perform simulation for the first command request, and processing is performed to service the first command request using non-simulation mode whereby the first command request is issued to a server to service the first command request.

15. The method of claim 11, wherein inquiries are made regarding whether simulation mode handlers of the prioritized list simulate the first command request and said prioritized list is processed until an indication is received that a first of the simulation mode handlers performs simulation for the first command request, an indication is received for each of the simulation mode handlers in the prioritized list denoting that said each simulation mode handler does not perform simulation for the first command request, or an indication is received from one of the simulation mode handlers that said one handler is capable of simulating the first command request and said one handler is disabled from simulating the first command request, and wherein responsive to the one simulation mode handler indicating that said one handler is capable of simulating the first command request and said one handler is disabled from simulating the first command request, servicing the first command request using non-simulation mode whereby the command request is issued to a server to service the first command request.

16. A system comprising:
a data storage system including:
one or more processors;
a memory including a data store of configuration data indicating a current data storage configuration of the data storage system; and
a first computer readable medium including code stored thereon, the first computer readable medium including code that, when executed by at least one of the one or more processors, performs processing including:
servicing command requests in connection with data storage system management operations; and
a management computer system including:
a processor; and
a second computer readable medium with code of a data storage system management application thereon, wherein the code of the data storage management application is executed by the processor and includes:
user interface code that is executed by the processor and issues command requests to first code;
said first code that is executed by the processor and receives command requests from the user interface code and determines at runtime whether to simulate received command requests using simulator code, or whether to service the received command requests by issuing the received command requests to the data storage system for servicing in a non-simulation mode; and
said simulator code that is executed by the processor and simulates command requests, said simulator code simulating processing performed by the data storage system to service command requests in connection with performing data storage system management operations, said simulator using configuration data simulating at least some entities of a current configuration of the data storage system.

17. The system of claim 16, wherein said first code determines whether to simulate a first command request in accordance with whether the simulator code includes code that simulates the first command request and whether simulation is disabled for the first command request.

18. A non-transitory computer readable medium comprising code stored thereon for servicing one or more command requests, the non-transitory computer readable medium comprising code, that when executed, performs processing including:
receiving a first command request;
determining whether to simulate servicing the first command request using a simulator or whether to service the first command by processing in accordance with a non-simulation mode, wherein said first command request is one of a plurality of command requests, and a first portion of the plurality of command requests are simulated whereby the first portion of commands are serviced using the simulator and a second portion of the command requests are serviced in the non-simulation mode; and
servicing the first command request in accordance with said determining, wherein the simulator simulates servicing command requests in connection with performing a data storage management operation, said simulator performing processing to simulate a data storage system servicing command requests in accordance with simulated configuration data simulating at least some entities of a current configuration of the data storage system.

19. The non-transitory computer readable medium of claim 17, wherein an option is specified for one command request of the second portion indicating that simulation mode for said one command request is disabled.

* * * * *